United States Patent [19]
Koers

[11] Patent Number: 5,445,660
[45] Date of Patent: Aug. 29, 1995

[54] APPARATUS FOR CLEANING GASES WITH THE AID OF ORGANIC FILTRATION MATERIAL

[75] Inventor: Bonno Koers, Amersfoort, Netherlands

[73] Assignee: N.V. Vuilafvoer Maatschappij Vam, Amsterdam, Netherlands

[21] Appl. No.: 200,157

[22] Filed: Feb. 23, 1994

[30] Foreign Application Priority Data

Mar. 3, 1993 [NL] Netherlands .......................... 9300385

[51] Int. Cl.$^6$ ............................................. B01D 53/00
[52] U.S. Cl. ...................................... 55/222; 55/233; 55/269; 95/211; 95/227; 435/266
[58] Field of Search ................ 55/222, 233, 257.7, 55/267, 269; 95/211, 214, 227, 285; 435/262, 266

[56] References Cited

U.S. PATENT DOCUMENTS

| | | | |
|---|---|---|---|
| 1,402,814 | 1/1922 | Wachtel | 55/233 |
| 2,033,665 | 3/1936 | Young | 55/233 |
| 3,683,593 | 8/1972 | Kent | 55/233 |
| 3,960,992 | 6/1976 | Cyrenne | 55/233 |
| 4,662,900 | 5/1987 | Ottengraf | 55/233 |
| 4,723,968 | 2/1988 | Schippert et al. | 55/222 |
| 4,734,111 | 3/1988 | Hoffmann et al. | 55/269 |
| 4,806,148 | 2/1989 | Ottengraf | 55/233 |
| 4,948,402 | 8/1990 | Davis | 55/233 |

FOREIGN PATENT DOCUMENTS

| | | | |
|---|---|---|---|
| 347407 | 12/1989 | European Pat. Off. | |
| 1346449 | 11/1963 | France | 55/233 |
| 24876312 | 2/1982 | France | |
| 2757317 | 7/1978 | Germany | 55/233 |
| 2721048 | 11/1978 | Germany | 95/214 |
| 8801502 | 4/1988 | Germany | |
| 9115389 | 1/1992 | Germany | |
| 8303031 | 3/1985 | Netherlands | |
| 8603689 | 7/1986 | WIPO | |

OTHER PUBLICATIONS

Bubinger, H., et al., "Grundlagen und Anwendungsbeispiele der Biofiltertechnologie", *Luft und Boden*, vol. 36, No. 5, May 1993, pp. 66 to 70.

*Primary Examiner*—C. Scott Bushey
*Attorney, Agent, or Firm*—Ladas & Parry

[57] ABSTRACT

Method and apparatus for the cleaning of gases, in particular air, with the aid of organic filtration material, in which the filtration material is placed upon a grating floor located inside a chamber (5) which is moveable and—after the filtration material has been charged in it—is lifted up and placed on top of an air supply room (1), such that a seal is obtained between the chamber (5) and the air supply room (1). After the filtration material has lost its activity, the chamber (5) can be lifted off the air supply room (1) and be replaced with a chamber (5) having new filtration material. The chamber (5) can be tilted for removing the filtration material from it, and can be provided with humidification tubes (14) and with tubing (15) for pre-heating the air.

9 Claims, 2 Drawing Sheets

APPARATUS FOR CLEANING GASES WITH THE AID OF ORGANIC FILTRATION MATERIAL

The invention relates to a method of cleaning gases, in particular air, with the aid of organic filtration material which is provided on a grating floor located inside a chamber formed by a number of substantially vertical walls, which chamber is positioned moveably on an air supply room, such that a seal is obtained between the walls of the chamber and the walls of the air supply room when the filtration material loses its activity, the chamber having the filtration material (13) is removed and replaced with a chamber having new filtration material in it.

BACKGROUND OF THE INVENTION

Such a method is known from DE-U-9,115,389. In this known method the organic filtration material is deposited directly on to the grating floor. The result of this is that the filtration material will dry out and therefore be less active when the air to be cleaned is passed through it. The portions of the filtration material will also not adjoin well, so that at least part of the air shall be filtered less well.

The invention has the purpose of removing this disadvantage, and to that end, it provides that the grating floor is first provided with a layer of gravel, followed by the organic filtration material, and that during use the gravel is kept humid by spraying water on to it from nozzles provided close above the layer of gravel.

The thickness of the layer of gravel shall, for example, be approximately 20 mm.

To further counteract the drying-out of the filtration material, humidification of the filtration material can be provided and can occur at several levels, one level lies above the filtration material, and the other is located at about half the height of the filtration material, from which level the gravel is humidified as well.

Further, there is the possibility of pre-heating the air to be cleaned by passing it through tubing which is located either immediately above or also inside the filtration material itself. In this the heat released during the bio-activity in the filtration material is utilized.

Such a method offers advantages in particular in the cleaning of air with a relatively low termperature by which the bacterial activity of the filtration material could be adversely affected. Air with a relatively low temperature is present in, for example, water-purification installations.

The invention also relates to an apparatus for the application of the method described above, which apparatus is characterized in that substantially horizontally extending tubes, provided with nozzles, have been provided in the chamber, which pass through at least one vertical wall of the chamber to the exterior for the connection or supply lines of spraying water to it.

In order to pass the air to be cleaned in succession through two or more chambers, the apparatus according to the invention can be characterized in that some similarly embodied chambers can be stacked for cleaning the air in stages because the bottom edge of a chamber can not only be placed on top of the air supply room, but also on top of the top edge of a similar chamber, and that a roofing assembly, provided with means for lifting it and for the discharge of air from the chamber, can be placed on top of the top edge.

The passing of air to be cleaned through two or more chambers can be of importance when there are certain components in the air which must be removed by special bacteria while other bacteria, necessary for the cleaning of the air, could be killed by these components.

The dimensions of the length and the breadth of the chamber and the means for engaging it shall correspond substantially to those of a standard container. Owing to this a vehicle suitable for the transportation of containers can be used for the transportation of the filtration chambers. Then the removal of the filtration material from the chambers and the filling of these again with fresh filtration material can take place at a central location. Skilled personnel can be available at the central location for optimum filling of the chambers. Owing to this, a large share of the filtration material removed from a container can also be used again.

According to the invention a grating floor provided in a chamber shall in particular be formed by a number of bars, rods or the like which are either directly or indirectly connected to the walls of the chamber for forming a coarse grating, on top of which coarse grating a grating mat, consisting of cross-laid and interconnected plastic wires, is placed. Such a mat is commercially available, and a suitable spacing between the wires is e.g. approximately 7 mm.

DE-U-8,801,502 illustrates a bio filter in which a number of chambers too have been stacked. The organic filtration material lies directly on top of the grating in here too. In this the edges of the chambers must adjoin well, for which the corners of the chambers have been provided with tubes that will telescope when the chambers are stacked. Therefore, the chambers will only be able to have limited dimensions since assembly or disassembly will be difficult or impossible as a result of even small temperature differences of the chambers.

Further NL-A-8,303,031 illustrates a filtration apparatus which is particularly suitable for flue gases and in which the gas is first passed through a pre-treatment chamber in which a gravel bed is located, on top of which liquid is sprayed, and subsequently passed through a filtration unit consisting of a grating floor on which the biologically active material is located. Thus, the apparatus is complicated and the replacing of the exhausted material will be much more difficult to perform.

BRIEF DESCRIPTION OF THE DRAWINGS

The invention shall be illustrated by means of the drawings, in which.

DETAILED DESCRIPTION OF THE INVENTION

Figure 1:
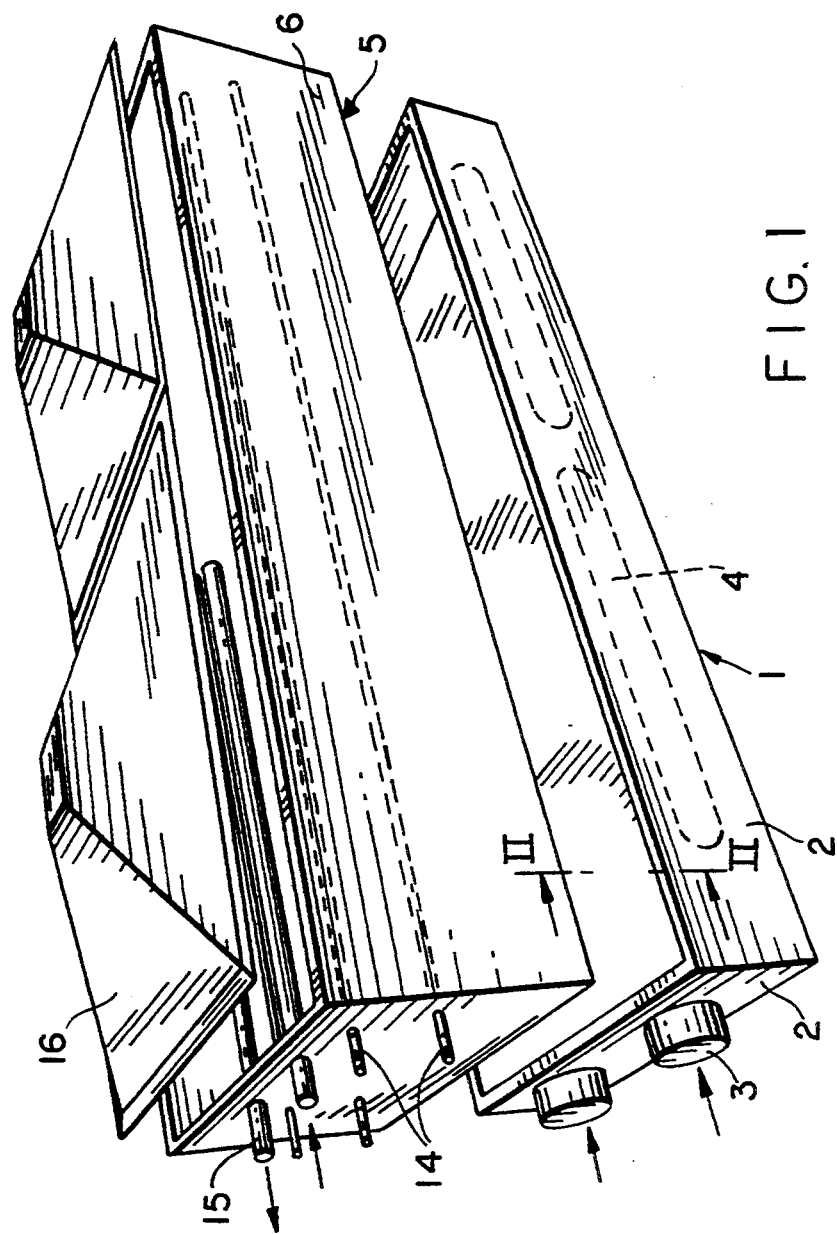
FIG. 1 schematically shows a perspective view of an apparatus according to the present invention, in which the parts of the apparatus are shown spaced at some distance from one another.
Figure 2:
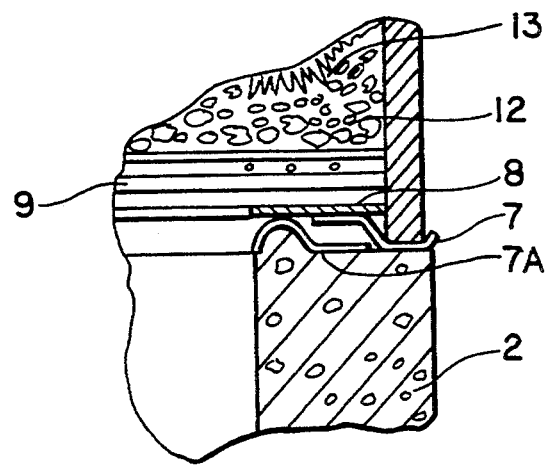
FIG. 2 schematically shows a cross-section of the adjoining wall parts of the air supply room and the chamber, taken along the line II—II in FIG. 1.
Figure 3:
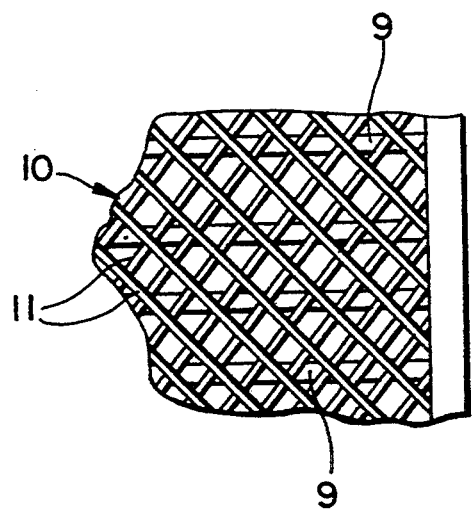
FIG. 3 schematically shows a top view of a portion of the grating floor as shown in FIG. 2.

FIG. 1 illustrates an apparatus according to the present invention consisting of the air supply room 1, which for example can be formed by a concrete bin with upwardly extending walls 2. The one wall 2 is provided with two connections 3 for supplying air to the room 1. The other wall 2 is eventually provided with openings 4, which can either be closed off or which serve for connecting an air supply room, which is to be placed adjoiningly, to it.

The chamber 5, which includes the four walls 6, is located above the air supply room 1. The bottom edge of the walls 6 is provided with a sealing strip 7 of flexible material. A similar strip 7A is also attached to the top edge of the walls 2. When the parts 1 and 5 are stacked, a double sealing is obtained between these parts because the latter strip 7A abuts an inwardly extending portion 8 of the wall 6.

Rods 9 or the like are provided in between the walls 6 for supporting a grating mat 10. This grating mat 10 consists of plastic wires 11 that have been placed across one another and are welded to each other.

During use of the apparatus gravel 12 is placed on the grating mat 10 in a layer with a thickness of several centimeters. The gravel serves for the supporting of the biofiltration material 13.

The biofiltration material 13 can be humidified because tubes 14, provided with cross-tubes having nozzles and not further specified, have been provided at several levels in the chamber 5.

The lower tubes 14 shall be located at a level and as much water will be supplied to them, such that the gravel 12 continuously stays humid. Through this the air entering the filter is humidified before it enters the biofiltration material, by which drying-out of this material is prevented. Of course, the other tubes 14 also serve this purpose.

When it is desirable to pre-heat the air that is to be supplied to the connections 3, this can occur by first passing the air through tube 15 which extends through chamber 5. The heat which arises through the bio-activity of the filtration material 13 can be transferred in this way to the air to be cleaned before it is supplied to room 1.

It will be clear that tubes 14 and 15 are provided with couplings not further specified, so that they can be disconnected rapidly during the replacement of chamber 5 with another one.

Since the apparatus will be positioned outdoors in most cases, chamber 5 will be covered by a roofing construction 16. The roofing construction 16 serves merely to prevent rainwater from falling on to the biofiltration material, and it can consist of two equal parts for example.

It will be clear that chamber 5 as well as the roofing construction 16 are provided with lifting and affixation means that are not further specified. The dimensions of chamber 5 will be such that the chamber can easily be transported similarily to as occurs with freight containers and the like. Two or more chambers 5 can also be stacked, and the roofing construction 16 can be placed on top of the uppermost chamber. To that end, the top edge of a chamber 5 will be embodied —not further specified— in such a way that an air-tight seal is obtained between this top edge and the bottom edge of a chamber placed on top of it, so that no air can escape to in between the two chambers.

It will be clear that merely a possible embodiment of an apparatus according to the invention has been illustrated in the drawing and has been described above, and that numerous modifications can be made without departing from the spirit of the invention.

I claim:

1. Apparatus for cleaning gases comprising a chamber positioned moveably on top of an air supply room, said air supply room having a bottom, four walls extending from the bottom, each of said air supply room walls having a top edge and a bottom edge, said chamber having four walls, each of said chamber walls having a bottom edge and a top edge, said chamber positioned on top of the air supply room such that the top edges of the air supply room meet the bottom edges of the chamber, a grating floor located inside the chamber, a layer of a gravel on said grating floor, a layer of organic biofiltration material on top of said gravel, a plurality of tubes extending through at least one vertical wall of the chamber, said tubes extending from the inside to the outside of the chamber such that each said tube extends to the outside of the chamber for connection to a water supply, wherein at least one tube is situated above the biofiltration material and at least one tube is situated at a location that is within the biofiltration material, each of said tubes having a nozzle located inside the chamber for discharging water into the chamber, a means for introducing the gases from outside the air supply room into the air supply room, a means for preheating the gases to be cleaned comprising tubing extending from the chamber to the air supply room and a means for discharging the cleansed gas from the chamber.

2. The apparatus according to claim 1, wherein said bottom edge of the chamber is provided with a sealing strip and said top edge of the air supply room is provided with a similar sealing strip so that when the chamber is positioned on top of the air supply room a seal is formed.

3. The apparatus according to claim 1 wherein the grating floor comprises cross-laid and interconnected bars.

4. The apparatus according to claim 3 wherein the bars are connected to the internal walls of the chamber.

5. The apparatus according to claim 3 wherein a grating mat comprising cross-laid and interconnected wires is positioned on top of the grating floor and beneath the layer of gravel.

6. The apparatus according to claim 5 wherein the nozzles are aligned with the biofiltration layer.

7. The apparatus according to claim 5 wherein the nozzles are situated above the biofiltration layer.

8. The apparatus according to claim 1 wherein the air supply room has an opening in a side wall for connecting to an additional air supply room.

9. The apparatus according to claim 1 wherein the chamber has a removable cover.

* * * * *